United States Patent
Blanding

(10) Patent No.: US 9,165,046 B2
(45) Date of Patent: Oct. 20, 2015

(54) CORE DATA SYNCHRONIZATION SYSTEMS AND METHODS

(71) Applicant: RealNetworks, Inc., Seattle, WA (US)

(72) Inventor: Stephen M. Blanding, Redmond, WA (US)

(73) Assignee: RealNetworks, Inc., Seattle, WA (US)

( * ) Notice: Subject to any disclaimer, the term of this patent is extended or adjusted under 35 U.S.C. 154(b) by 88 days.

(21) Appl. No.: 13/742,169

(22) Filed: Jan. 15, 2013

(65) Prior Publication Data

US 2014/0201139 A1    Jul. 17, 2014

(51) Int. Cl.
*G06F 7/00*     (2006.01)
*G06F 17/00*    (2006.01)
*G06F 17/30*    (2006.01)

(52) U.S. Cl.
CPC ................. *G06F 17/30575* (2013.01)

(58) Field of Classification Search
CPC .............. H04L 67/1095; H04L 67/306; G06F 17/30575; G06Q 10/3107; G06Q 10/3109
USPC ........................................................ 707/621
See application file for complete search history.

(56) References Cited

U.S. PATENT DOCUMENTS

| | | | |
|---|---|---|---|
| 8,112,460 B2* | 2/2012 | Arthursson et al. | 707/810 |
| 2007/0219976 A1* | 9/2007 | Muralidhar et al. | 707/4 |
| 2009/0037484 A1* | 2/2009 | Ireland | 707/200 |
| 2009/0198702 A1* | 8/2009 | Novik et al. | 707/10 |
| 2010/0106684 A1* | 4/2010 | Pizzo et al. | 707/610 |
| 2012/0047169 A1* | 2/2012 | Schroeder et al. | 707/770 |
| 2012/0079126 A1* | 3/2012 | Evans et al. | 709/230 |
| 2012/0185672 A1* | 7/2012 | Gara et al. | 712/30 |
| 2012/0239617 A1* | 9/2012 | Savenok et al. | 707/620 |
| 2012/0310882 A1* | 12/2012 | Werner et al. | 707/624 |
| 2012/0331177 A1* | 12/2012 | Jensen | 709/248 |

OTHER PUBLICATIONS

Apple Inc. (Sep. 9, 2012). "Core Data Programming Guide". Retrieved from http://developer.apple.com/iphone/library/documentation/Cocoa/Conceptual/CoreData/cdProgrammingGuide.html.
"iOS synchronization—what is a good way for a Core Data object to know it has to be pushed to server?". (May 2, 2012) Stack Overflow. Retrieved Nov. 20, 2012, from http://stackoverflow.com/questions/3327752.
"Core Data cloud sync—need help with logic". (Jul. 10, 2012). Retrieved Nov. 20, 2012, from http://stackoverflow.com/questions/10415289.

* cited by examiner

*Primary Examiner* — Robert Beausoliel, Jr.
*Assistant Examiner* — Nicholas Allen
(74) *Attorney, Agent, or Firm* — AEON Law; Adam L. K. Philipp

(57) ABSTRACT

To synchronize data between a remote database and a local object-graph-and-persistence-framework, a synchronization framework receives messages from the local object-graph-and-persistence-framework indicating that a locally-managed object has been retrieved from a local datastore and instantiated or that the locally-managed object has been created, modified, or deleted. When the synchronization framework determines that the message was instigated by a local user's activity (as opposed to a background synchronization process), the synchronization framework synchronizes the locally-managed object with the remote database.

19 Claims, 6 Drawing Sheets

CORE DATA SYNCHRONIZATION SYSTEMS AND METHODS

FIELD

The present disclosure relates to the field of computing, and more particularly, to data synchronization between a local datastore and a remote database.

BACKGROUND

On computer systems running Mac OS X and on mobile devices running iOS, Core Data is an object graph and persistence framework provided by Apple Inc. of Cupertino, Calif. Core Data handles many of the duties of the data model in a model-view-controller design. For example, Core Data allows data organized by the relational entity-attribute model to be serialized into various local data stores. The data can be manipulated using higher-level objects representing entities and their relationships, while Core Data provides queries against the data and handles local persistence.

However, in many cases, an application running on a client device may wish to synchronize locally-managed data with data stored "in the cloud" or in a remote data store. To that end, methods are needed to determine which locally-managed objects need synchronization and when.

DESCRIPTION

Figure 1:
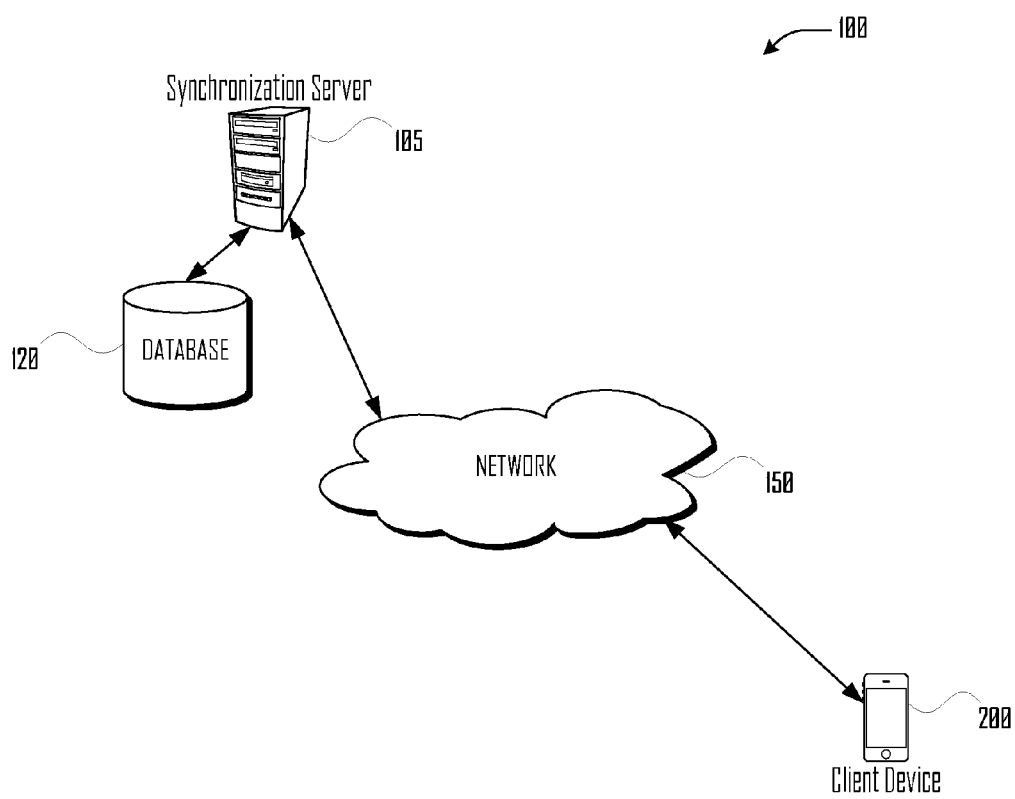
FIG. 1 illustrates a data object synchronization system in accordance with one embodiment.

In various embodiments as described herein, to synchronize data between a remote database and a local object-graph-and-persistence-framework, a synchronization framework receives messages from the local object-graph-and-persistence-framework indicating that a locally-managed object has been retrieved from a local datastore and instantiated or that the locally-managed object has been created, modified, or deleted. When the synchronization framework determines that the message was instigated by a local user's activity (as opposed to a background synchronization process), the synchronization framework synchronizes the locally-managed object with the remote database.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a data object synchronization system in accordance with one embodiment. Synchronization server 105 and client device 200 are connected to network 150. In various embodiments, synchronization server 105 may comprise one or more physical and/or logical devices that collectively provide the functionalities described herein. In some embodiments, synchronization server 105 may comprise one or more replicated and/or distributed physical or logical devices. In some embodiments, synchronization server 105 may comprise one or more computing resources provisioned from a "cloud computing" provider.

In various embodiments, network 150 may include the Internet, a local area network ("LAN"), a wide area network ("WAN"), a cellular data network, and/or other data network. In various embodiments, client device 200 may include desktop PC, mobile phone, laptop, tablet, or other computing device that is capable of connecting to network 150 and synchronizing objects as described herein.

Figure 2:
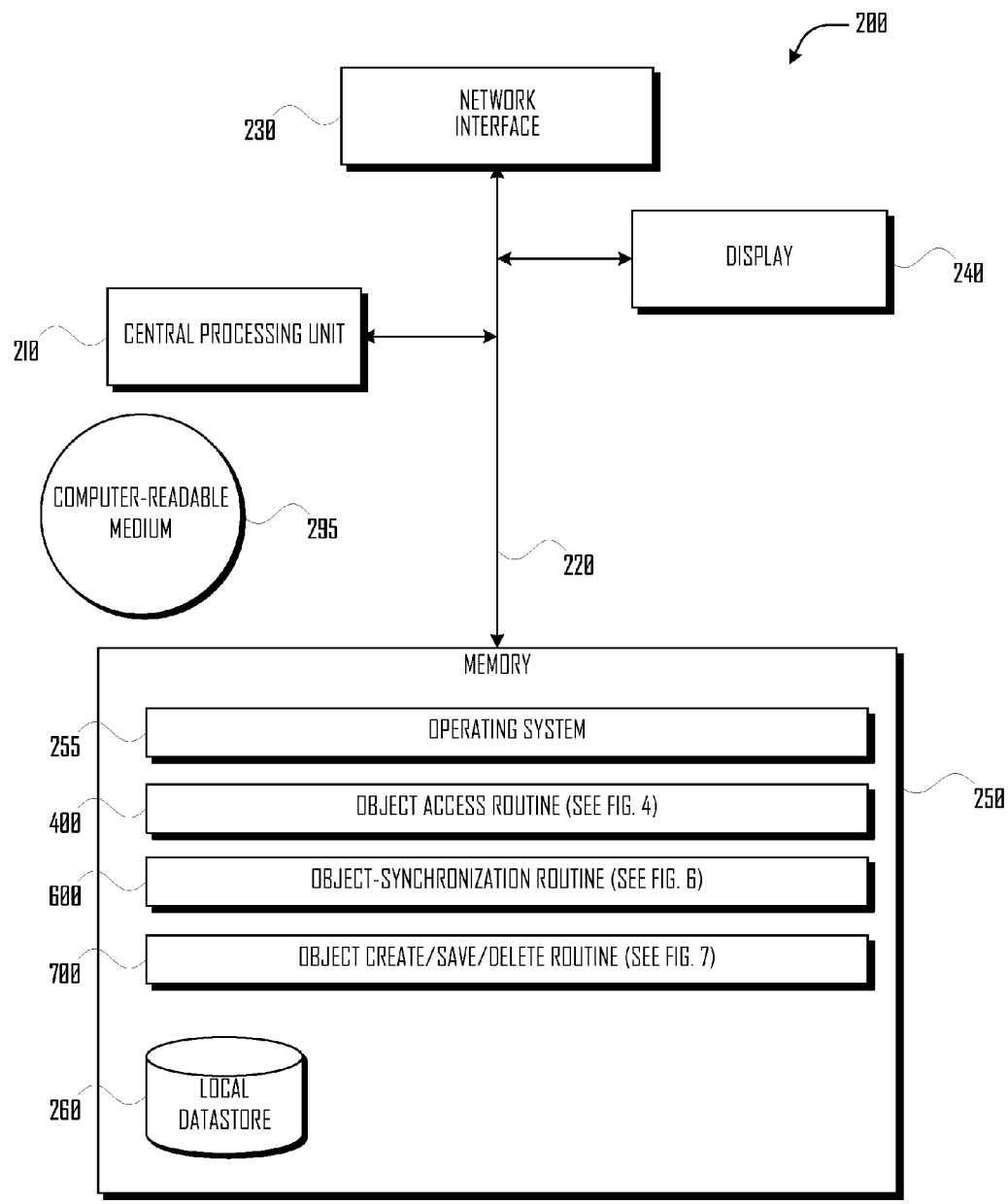
FIG. 2 illustrates several components of an exemplary client device in accordance with one embodiment.

FIG. 2 illustrates several components of an exemplary client device in accordance with one embodiment. In some embodiments, client device 200 may include many more components than those shown in FIG. 2. However, it is not necessary that all of these generally conventional components be shown in order to disclose an illustrative embodiment.

Client device 200 also includes a processing unit 210, a memory 250, and a display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for a routine 400 for determining whether a locally-managed data object should be synchronized to a remote database when the locally-managed data object is accessed (see FIG. 4, discussed below); a routine 600 for background-synchronizing local data objects with a remote database (see FIG. 6, discussed below); and a routine 700 for determining whether a locally-managed data object should be synchronized to a remote database when the locally-managed data object is validated (see FIG. 7, discussed below). In addition, the memory 250 also stores an operating system 255.

These and other software components may be loaded into memory 250 of client device 200 using a drive mechanism (not shown) associated with a non-transient computer readable storage medium 295, such as a floppy disc, tape, DVD/CD-ROM drive, memory card, or the like. In some embodiments, software components may alternately be loaded via the network interface 230, rather than via a non-transient computer readable storage medium 295.
}

Figure 3:
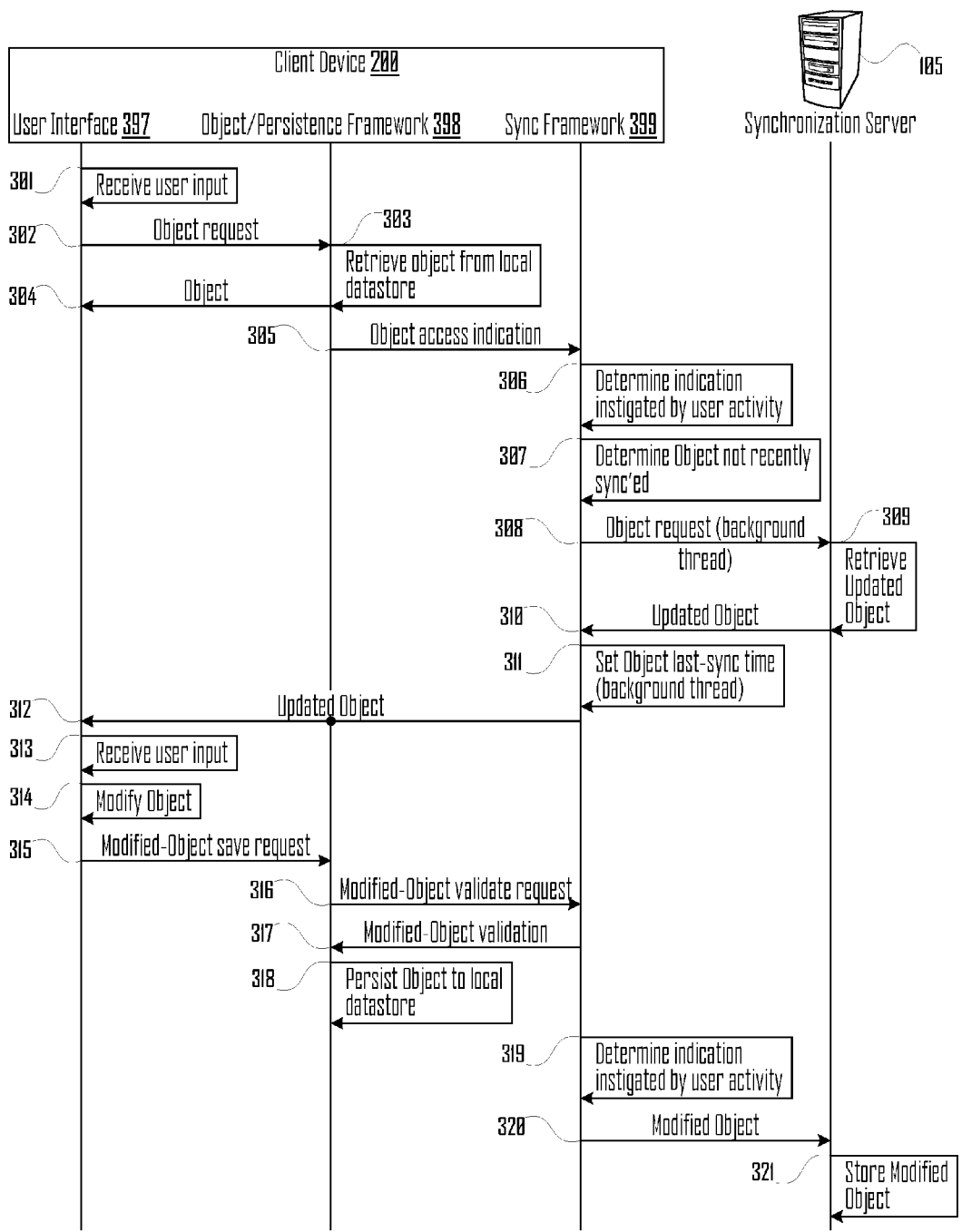
FIG. 3 illustrates an exemplary series of communications between client device and synchronization server, in accordance with one embodiment.

FIG. 3 illustrates an exemplary series of communications between client device 200 and synchronization server 105, in accordance with one embodiment. Also illustrated are communications between user interface 397, local object-graph-and-persistence-framework 398, and synchronization framework 399.

Beginning the illustrated sequence of communications, client device 200 receives user input 301 via user interface 397. For example, the user may interact with an application and indicate that he or she wishes to view and/or interact with a data object (e.g., a digital image).

In response to the user input, user interface 397 sends to local object-graph-and-persistence-framework 398 an object request 302 requesting that local object-graph-and-persistence-framework 398 identify, retrieve, and instantiate the requested object.

Local object-graph-and-persistence-framework 398 retrieves 303 the requested data object from local datastore and sends the retrieved data object 34 to user interface 397. In addition, local object-graph-and-persistence-framework 398 sends to synchronization framework 399 a message 305 notifying synchronization framework 399 that the data object was accessed. For example, in one embodiment, the message may include an 'awakeFromFetch' message, which is sent automatically by the Core Data framework after the receiver has been fetched.

In such an embodiment, the receiver of the message may be the object itself. In some cases, the object may be of a type that is or descends from a class provided by the synchronization framework 399. In other cases, the object may be of an arbitrary type, but it may adhere to a protocol provided by the synchronization framework 399 and/or it may implement one or more methods or message handlers as specified by the synchronization framework 399.

When synchronization framework 399 receives message 305, it determines 306 whether the message was instigated or sent in response to user activity, as opposed to having been send in response to background activity of the synchronization framework 399 itself. In one embodiment, synchronization framework 399 may determine whether the message was instigated by user activity by determining whether the method or message handler was invoked on an application's main thread.

Typically, communications 301-306 (discussed above) would all be performed on an application's main thread, whereas synchronization activities (discussed below) may execute on a background thread. Consequently, synchronization framework 399 may distinguish between user-instigated object operations, which are performed on a main thread, and non-user-instigated object operations, such as synchronization operations, which are performed on a background thread.

When synchronization framework 399 determines that message 305 was instigated by user activity, it determines 307 whether the data object has been recently synchronized with a remote database. In the illustrated sequence of communications, the data object was not recently synchronized. In various embodiments, a predetermined threshold number of seconds, hours, or minutes may be used to determine whether a previous synchronization process was "recent".

Having determined that the data object was not recently synchronized, synchronization framework 399 sends a request 308 to synchronization server 105 for a current copy of the data object. As discussed above, such synchronization activity typically takes place on a background thread. In such embodiments, synchronization framework 399 may queue request 308 to take place at a later time.

Having received request 308, synchronization server 105 retrieves 309 the requested data object and sends it 310 to synchronization framework 399 on client device 200. In the illustrated example, synchronization server 105 holds a version of the data object that has been updated more recently than the copy of the data object that exists on client device 200.

Having received the updated data object (typically on a background thread), synchronization framework 399 sets a property or otherwise marks the updated data object as having been synchronized with synchronization server 105 at a current time. Before providing 312 the updated data object to local object-graph-and-persistence-framework 398 for use in the user interface 397.

Typically, providing the updated data object to local object-graph-and-persistence-framework 398 (on a background thread) would instigate one or more messages from local object-graph-and-persistence-framework 398 to synchronization framework 399, similar to message 305 (discussed above) and validate message (discussed below). However, as such messages would have been instigated via a background thread, synchronization framework 399 would not attempt to re-synchronize the updated data object with synchronization server 105 until the user modifies or deletes the updated data object and/or until a predetermined number of seconds, minutes, or hours have passed.

In the illustrated example, at some point after the updated data object becomes available in user interface 397, user interface 397 (executing on a main thread) receives 313 input from the user, which modifies 314 the updated data object.

At some point thereafter, user interface 397 sends to local object-graph-and-persistence-framework 398 (on the main thread) a request 315 to persist the user-modified data object. In the course of persisting the user-modified data object, local object-graph-and-persistence-framework 398 sends to synchronization framework 399 a validate message. For example, in one embodiment, the Core Data framework provides an infrastructure for supporting validation. Core Data provides a set of validation methods ('validateForInsert', 'validateForUpdate', and 'validateForDelete') for validating a data object at different stages of its life-cycle (insertion, update, and deletion). By implementing such methods and/or handlers for such messages, a data object within synchronization framework 399 will be notified when local object-graph-and-persistence-framework 398 has been called to create, update, or delete the data object.

In the illustrated example, synchronization framework 399 returns a validation 317 to local object-graph-and-persistence-framework 398, which allows local object-graph-and-persistence-framework 398 to persist 318 the user-modified data object to a local datastore. For example, in one embodiment, the receiver of the validate message may return the value returned by a superclass implementation of a method or handler for handling validate message. In some embodiments, synchronization framework 399 may instead or in addition perform its own validation operations (not shown) on the user-modified data object.

In addition, when synchronization framework 399 receives validate message, it also determines 319 whether the message was instigated by user activity. For example, in one embodiment, synchronization framework 399 may determine whether the method or message handler was invoked on an application's main thread (indicating instigation by a user via user interface 397) or on a background thread (indicating instigation by a synchronization or other background process).

In the illustrated example, synchronization framework 399 determines that validate message was instigated by user activity, so synchronization framework 399 sends the user-modified data object 320 to synchronization server 105 for synchronization and remote storage 321.

In various embodiments, the actual synchronization process (not shown) performed by client device 200 and/or synchronization server 105 may include determining and/or reconciling a set of differences between a local copy of a data object (as persisted on client device 200) and a remote copy of the same data object (as persisted on synchronization server 105). In various embodiments, any suitable methods for determining and/or reconciling such differences may be employed.

Figure 4:
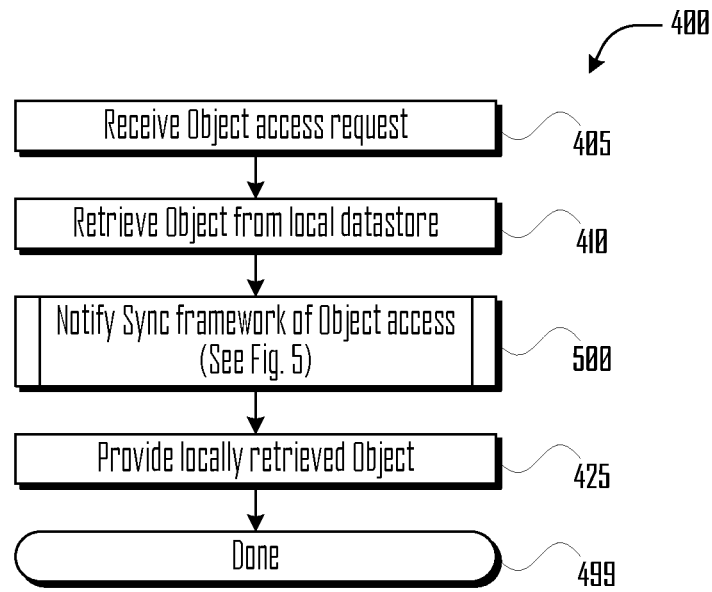
FIG. 4 illustrates a routine for determining whether a locally-managed data object should be synchronized to a remote database when the locally-managed data object is accessed, such as may be performed by a client device in accordance with one embodiment.

FIG. 4 illustrates a routine 400 for determining whether a locally-managed data object should be synchronized to a remote database when the locally-managed data object is accessed, such as may be performed by a client device 200 in accordance with one embodiment.

In block 405, routine 400 receives a request to access a locally-managed data object stored in a local datastore. In various embodiments, the request may be received by a local object-graph-and-persistence-framework.

In block 410, routine 400 accesses the local datastore and retrieves the locally-managed data object requested in block 405. In subroutine block 500, routine 400 calls subroutine 500 (see FIG. 5, discussed below) to notify a local synchronization framework that the locally-managed data object was accessed. For example, in one embodiment, notifying the local synchronization framework may include sending an 'awakeFromFetch' message after the object has been fetched.

In such an embodiment, as discussed above, the receiver of the message may be the object itself. In some cases, the object may be of a type that is or descends from a class provided by the synchronization framework. In other cases, the object may be of an arbitrary type, but it may adhere to a protocol provided by the synchronization framework and/or it may implement one or more methods or message handlers as specified by the synchronization framework.

In block 425, routine 400 provides the locally-managed data object retrieved in block 410 to the requestor. Routine 400 ends in ending block 499.

Figure 5:
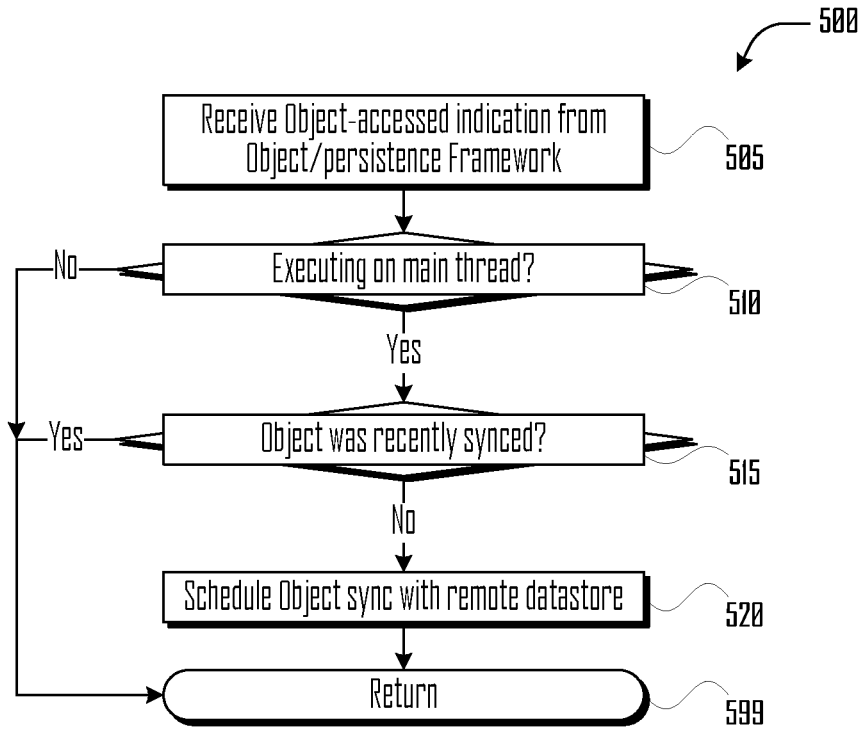
FIG. 5 illustrates a subroutine for determining whether to synchronize a locally-managed data object upon access, in accordance with one embodiment.

FIG. 5 illustrates a subroutine 500 for determining whether to synchronize a locally-managed data object upon access, in accordance with one embodiment. In block 505, subroutine 500 receives an indication from a local object-graph-and-persistence-framework that a locally-managed data object has been accessed. As discussed above, in one embodiment, the indication may include an 'awakeFromFetch' message received by a data object that has been retrieved from a local datastore.

In decision block 510, subroutine 500 determines whether subroutine 500 is executing on a main thread. For example, in one embodiment, when executing on an iOS device, subroutine 500 may send an 'isMainThread' message to a NSThread class object, receiving a Boolean value that indicates whether the current thread is the main thread. As discussed above, in some embodiments, the object access may be deemed to have been instigated by user activity when subroutine 500 is executing on a main thread.

If in decision block 510, subroutine 500 determines that it is executing on a main thread, then subroutine 500 proceeds to decision block 515. Otherwise, subroutine 500 proceeds to ending block 599.

In decision block 515, subroutine 500 determines whether the data object whose access was indicated in block 505 was recently synchronized with a remote database. In various embodiments, a predetermined threshold number of seconds, hours, or minutes may be used to determine whether a previous synchronization process was "recent". If in decision block 515, subroutine 500 determines that the data object whose access was indicated in block 505 was recently synchronized, then subroutine 500 proceeds to ending block 599.

Otherwise, in block 520, subroutine 500 schedules the data object to be synchronized with a remote database, such as via routine 600 (see FIG. 6, discussed below). Subroutine 500 ends in ending block 599, returning to the caller.

Figure 6:
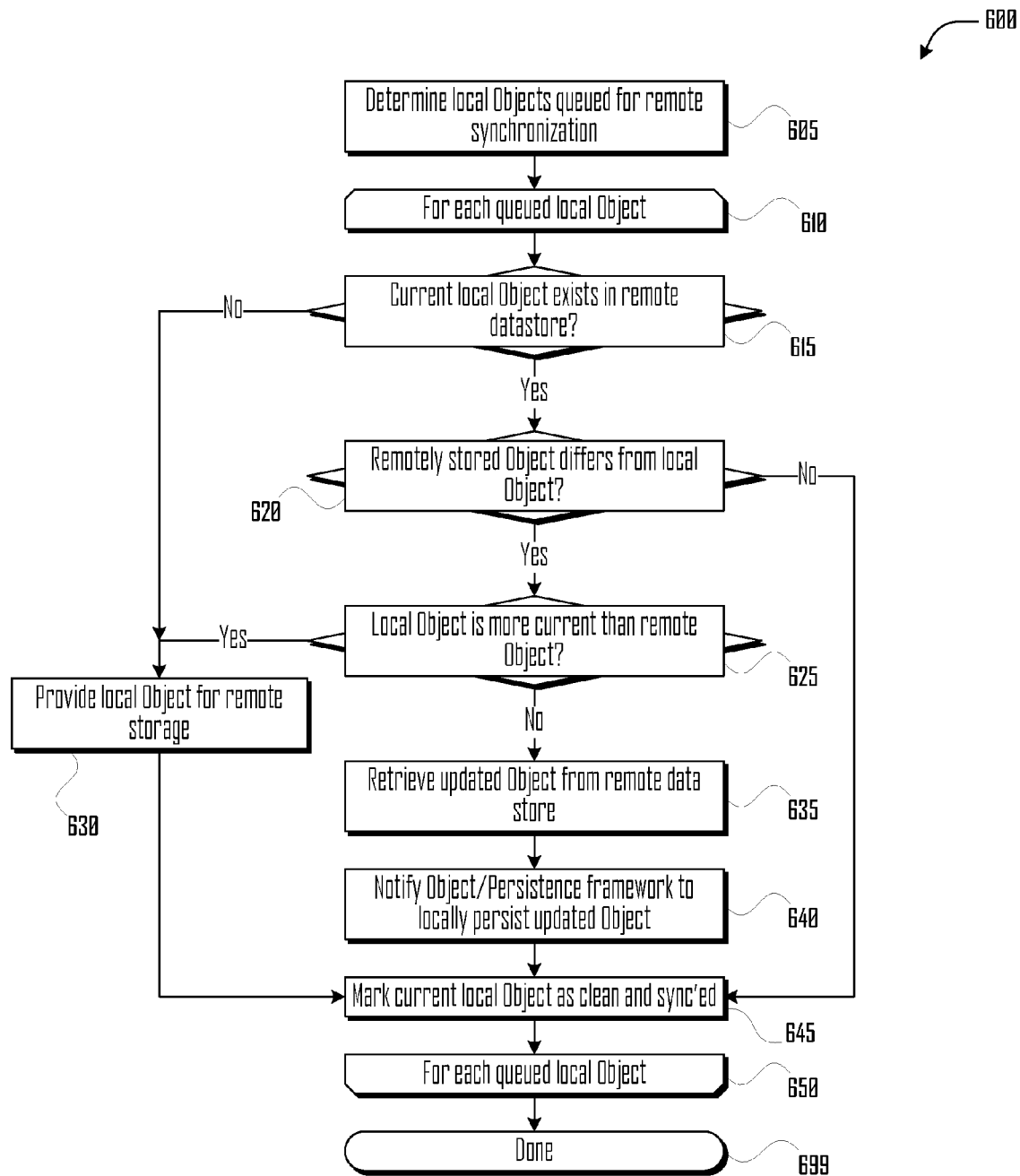
FIG. 6 illustrates a routine for background-synchronizing local data objects with a remote database, such as may be performed by a client device in accordance with one embodiment.

FIG. 6 illustrates a routine 600 for background-synchronizing local data objects with a remote database, such as may be performed by a client device 200 in accordance with one embodiment.

In block 605, routine 600 determines one or more local data objects that have been queued for synchronization with a remote database. In some embodiments, this and other operations of routine 600 as described herein may take place on a background thread or otherwise not on a main thread of an application.

In opening loop block 610, routine 600 processes each queued local data object in turn. In decision block 615, routine 600 determines whether a remote copy of the current local data object exists in the remote database. If so, routine 600 proceeds to decision block 620 (discussed below). Otherwise, routine 600 proceeds to block 630 (discussed below).

In decision block 620, routine 600 determines whether the remote copy differs from the current local data object. If so, then routine 600 proceeds to decision block 625. Otherwise, routine 600 proceeds to block 645. In decision block 625, routine 600 determines whether the current local data object is more current than the remote copy. In other embodiments, the synchronization process may determine object differences on a property-by-property or other granular basis. In various embodiments, any suitable methods for determining and/or reconciling such differences may be employed.

If so, then routine 600 proceeds to block 630. Otherwise, routine 600 proceeds to block 635. In block 630, routine 600 provides the current local data object to be persisted in the remote database. In block 635, routine 600 requests and receives the remote copy of the current local data object from the remote database. In block 640, routine 600 notifies the local object-graph-and-persistence-framework to locally persist the updated copy of the current local data object, as received in block 635. In so doing, routine 600 may cause local object-graph-and-persistence-framework to invoke routine 700 (see FIG. 7, discussed below) from a background thread.

In block 645, routine 600 marks the current local data object as 'clean' and synchronized as of a current time. In ending loop block 650, routine 600 iterates back to opening loop block 610 to process the next queued local data object, if any. Once each queued local data object has been processed, routine 600 ends in ending block 699.

Figure 7:
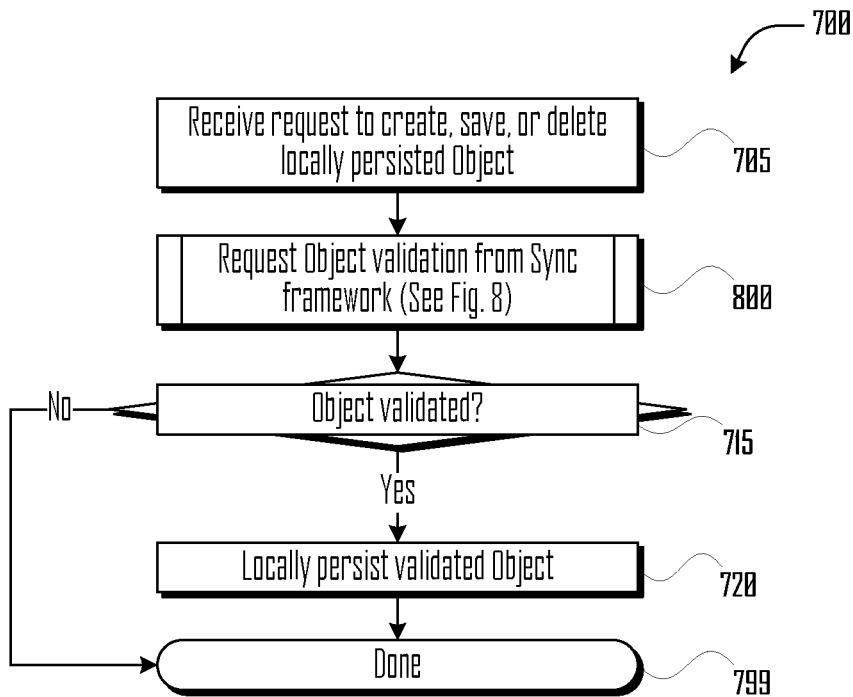
FIG. 7 illustrates a routine for determining whether a locally-managed data object should be synchronized to a remote database when the locally-managed data object is validated, such as may be performed by a client device in accordance with one embodiment.

FIG. 7 illustrates a routine 700 for determining whether a locally-managed data object should be synchronized to a remote database when the locally-managed data object is validated, such as may be performed by a client device 200 in accordance with one embodiment.

In block 705, routine 700 receives a request to create, save, or delete a locally-managed data object stored in a local datastore. In various embodiments, the request may be received by a local object-graph-and-persistence-framework.

In subroutine block 800, routine 700 calls subroutine 800 (see FIG. 8, discussed below) to notify a local synchronization framework that the locally-managed data object is to be created, saved, or deleted. For example, in one embodiment, notifying the local synchronization framework may include sending a 'validateForInsert', 'validateForUpdate', or 'validateForDelete' message to a receiver.

In such an embodiment, as discussed above, the receiver of the message may be the object itself. In some cases, the object may be of a type that is or descends from a class provided by the synchronization framework. In other cases, the object may be of an arbitrary type, but it may adhere to a protocol provided by the synchronization framework and/or it may implement one or more methods or message handlers as specified by the synchronization framework.

In decision block 715, routine 700 determines whether the data object was validated in subroutine block 800. If so, then routine 700 proceeds to block 720. Otherwise, routine 700 proceeds to ending block 799. In block 720, routine 700 locally persists the validated data object in a local datastore. Routine 700 ends in ending block 799.

Figure 8:
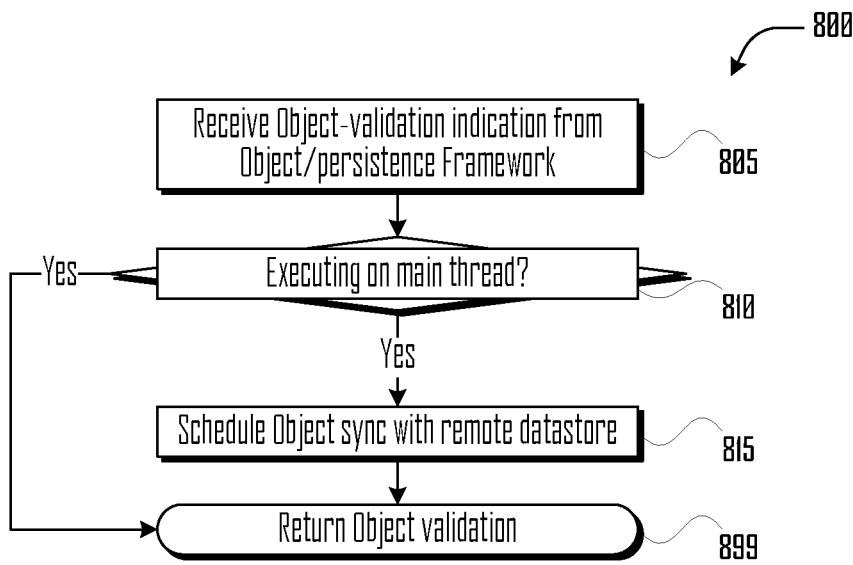
FIG. 8 illustrates a subroutine for determining whether to synchronize a locally-managed data object upon validation, in accordance with one embodiment.

FIG. 8 illustrates a subroutine 800 for determining whether to synchronize a locally-managed data object upon validation, in accordance with one embodiment. In block 805, subroutine 800 receives an indication from a local object-graph-and-persistence-framework that a locally-managed data object is to be created, saved, or deleted. As discussed above, in one embodiment, the indication may include an 'validateForInsert', 'validateForUpdate', or 'validateForDelete' message received by a data object.

In decision block 810, subroutine 800 determines whether subroutine 800 is executing on a main thread. For example, in one embodiment, when executing on an iOS device, subroutine 800 may send an 'isMainThread' message to a NSThread class object, receiving a Boolean value that indicates whether the current thread is the main thread. As discussed above, in some embodiments, the object access may be deemed to have been instigated by user activity when subroutine 800 is executing on a main thread.

If in decision block 810, subroutine 800 determines that it is executing on a main thread, then subroutine 800 proceeds to decision block 515. Otherwise, subroutine 800 proceeds to ending block 899.

In block 815, subroutine 800 schedules the data object to be synchronized with a remote database, such as via routine 600 (see FIG. 6, discussed above). Subroutine 800 ends in ending block 899, returning to the caller an object validation value. For example, in one embodiment, subroutine 800 may validate the object proposed for creation, saving, or deletion according to one or more predetermined criteria. In other embodiments, subroutine 800 may return the value returned by a superclass implementation of a method or handler for handling the validation message received in block 805.

Following is pseudo-code illustrating portions of a Sample Object that implements various synchronization framework functionalities, similar to that described above. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Exemplary pseudo-code file, 'TPCachedObject.h':

```
// TPCachedObject.h
// Tapestry
//
// Created by Steve Blanding on 3/21/12.
// Copyright (c) 2012 RealNetworks, Inc. All rights reserved.
//
// Implements some helper methods for synchronizing cached objects in our
local database with the server.
#import <Foundation/Foundation.h>
@protocol TPCachedObject <NSObject>
+(void)update:(NSManagedObjectID*)objectID;
-(void)updateWithMOC:(NSManagedObjectContext*)moc;
+(void)synchronize:(NSManagedObjectID*)objectID;
@end
```

Exemplary pseudo-code file, 'SampleObject.h':

```
// SampleObject.h
//
// Demonstrates the basics of synchronizing our local core data database
(TPLocalCache) with
// the server representation.
//
// Copyright (c) 2012 RealNetworks, Inc. All rights reserved.
//
#import <Foundation/Foundation.h>
#import <local object-graph-and-persistence-framework local object-graph-
and-persistence-framework.h>
#import "TPCachedObject.h"
@interface SampleObject: NSManagedObject <TPCachedObject>
@property (nonatomic, retain) NSString * someProperty;
// SampleObject.h
@property (nonatomic, retain) NSString * p_serverID;
@property (nonatomic, retain) NSDate * p_timeChecked;
@property (nonatomic, retain) NSString * p_timestamp;
@property (nonatomic, retain) NSNumber * p_dirty;
@end
@interface SampleObject (CoreDataGeneratedAccessors)
#pragma mark Helper methods
@end
```

Exemplary pseudo-code file, 'SampleObject.m':

```
// SampleObject.m
//
// Demonstrates the basics of synchronizing our local core data database
(TPLocalCache) with
// the server representation.
//
// Copyright (c) 2012 RealNetworks, Inc. All rights reserved.
//
#import "SampleObject.h"
#import "TPTapestryAccount.h" // provides network account services - outside of the
scope of this document
@interface SampleObject(PrivateMethods)
@end
@implementation SampleObject
@dynamic someProperty;
@dynamic p_serverID;
@dynamic p_timeChecked;
@dynamic p_timestamp;
@dynamic p_dirty;
```

```
#pragma mark synchronization methods
// SampleObject.m
-(void)awakeFromFetch
{
   if ([NSThread isMainThread])
   {
      TPTapestryAccount * account = [TPTapestryAccount sharedTapestryAccount];
      if (!account.isLoggedIn)
      {
         NSAssert(account.isLoggedIn, @"User isn't logged in.");
      }
      else
      {
         if ([self.p_dirty boolValue] == NO && (nil == self.p_timeChecked ||
kIntervalBetweenUpdates < [self.p_timeChecked timeIntervalSinceNow]))
         {
            [[TPLocalCache sharedInstance] synchronizeObject:[self objectID]];
         }
      }
   }
   [super awakeFromFetch];
}
#pragma mark validation methods
-(BOOL)validateForDelete:(NSError *_autoreleasing *)error
{
   // WARNING: Be advised that SETTING any property (whether the value changes or not)
will probably cause this object to be revalidated.
   if ([NSThread isMainThread])
   {
      [TPMediaCache.sharedMediaCache removeCachedImage:self];
      if (self.p_serverID) // if a server ID has been assigned then we know that this
object exists on the server
      {
         NSManagedObjectContext * maintenanceMOC = [[TPLocalCache sharedInstance]
maintenanceMOC];
         // make sure haven't already marked this item for deletion
         // objects marked for deletion are put in a seperate list until they have been
removed from the server
         NSFetchRequest * request = [[NSFetchRequest alloc] init];
// SampleObject.m
         [request setEntity:[NSEntityDescription entityForName:@"TPObjectPendingDeletion"
             inManagedObjectContext:maintenanceMOC]];
         [request setPredicate:[NSPredicate predicateWithFormat:@"serverID == %@",
self.p_serverID]];
         NSArray * result = [maintenanceMOC executeFetchRequest:request error:nil];
         if (result.count == 0)
         {
            TPMediaPendingDeletion * deletionEntry = [NSEntityDescription
insertNewObjectForEntityForName:@"TPObjectPendingDeletion"
inManagedObjectContext:maintenanceMOC];
            deletionEntry.mediaID = self.p_mediaID;
            [maintenanceMOC save:nil];
         }
         [[TPLocalCache sharedInstance] queueUpdate];
      }
   }
   return [super validateForDelete:error];
}
-(BOOL)validateForInsert:(NSError *_autoreleasing *)error
{
   // WARNING: Be advised that SETTING any property (whether the value changes or not)
will probably cause this object to be revalidated.
   if ([NSThread isMainThread])
   {
      if ([self.p_dirty boolValue] == NO)
      {
         self.p_dirty = [NSNumber numberWithBool:YES];
      }
      [[TPLocalCache sharedInstance] queueUpdate];
   }
   return [super validateForInsert:error];
}
-(BOOL)validateForUpdate:(NSError *_autoreleasing *)error
{
   // WARNING: Be advised that SETTING any property (whether the value changes or not)
will probably cause this object to be revalidated.
   if ([NSThread isMainThread])
// SampleObject.m
   {
```

```objc
        if ([self.p_dirty boolValue] == NO)
        {
            self.p_dirty = [NSNumber numberWithBool:YES];
        }
        [[TPLocalCache sharedInstance] queueUpdate];
    }
    return [super validateForUpdate:error];
}
static const float kRunInterval = 0.1;
+(void)synchronize:(NSManagedObjectID *)objectID {
    NSManagedObjectContext * moc = [[TPLocalCache sharedInstance] managedObjectContext];
    BOOL needToSaveMOC = NO;
    BOOL operationIncomplete = NO;
    SampleObject * sampleObject = (SampleObject*)[moc existingObjectWithID:objectID error:nil];
    NSLog(@"Synchronizing %@" , sampleObject);
    TPTapestryAccount * account = [TPTapestryAccount sharedTapestryAccount];
    if (!account.isLoggedIn || ![TPUtilities shouldDownloadPictures])
    {
        operationIncomplete = YES;
    }
    else
    {
        // any metadata that might need to be synchronized will be retrieved here
        operationIncomplete = NO;
    }
    if (!operationIncomplete)
    {
        // remember when we last synchronized
        sampleObject.p_timeChecked = [NSDate date];
        needToSaveMOC = YES;
    }
    if (needToSaveMOC)
    {
        NSError * error = nil;
// SampleObject.m
        if (![moc save:&error])
        {
            NSLog(@"Unresolved error %@, %@", error, [error userInfo]);
            [moc rollback];
        }
    }
}
-(void)updateWithMOC:(NSManagedObjectContext *)moc
{
    NSLog(@"Updating %@", self);
    TPTapestryAccount * account = [TPTapestryAccount sharedTapestryAccount];
    if (!account.isLoggedIn)
    {
        // TODO: prompt the user for login
        NSAssert(account.isLoggedIn, @"User must be logged in to update the object on the server.");
    }
    else
    {
        BOOL operationIncomplete = NO;
        BOOL needToSaveMOC = NO;
        if (!operationIncomplete && self.p_serverID == nil)
        {
            // if p_serverID hasn't been set yet then the object needs to be created on the server (it only exists locally)
            // DO WHATEVER NEEDS TO BE DONE TO UPLOAD THE OBJECT TO THE SERVER
            self.p_serverID = UploadTheObjectAndReturnTheServersIDForTheObjectHere(some, parameters, go, here);
            needToSaveMOC = YES; // we've changed a property on our object so we need to save the MOC.
            // Ordinarily we'd check for errors here and react accordingly.
            operationIncomplete = NO; // set to YES if the upload failed
        }
        else
        {
            // update any properties that need updating
// SampleObject.m
            operationIncomplete = NO; // set to YES if the upload failed
        }
        if (!operationIncomplete)
        {
            // everything seems to have succeeded so we can mark this object as clean
            self.p_dirty = [NSNumber numberWithBool:NO];
```

-continued

```
            needToSaveMOC = YES;
        }
        if (needToSaveMOC)
        {
            [moc save:nil];
        }
    }
}
+(void)update:(NSManagedObjectID*)objectID {
    NSManagedObjectContext * moc = [[TPLocalCache sharedInstance] managedObjectContext];
    SampleObject * sampleObject = (SampleObject*)[moc existingObjectWithID:objectID
error:nil];
    [sampleObject updateWithMOC:moc];
}
@end
```

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for synchronizing data between a remote database and a local object-graph-and-persistence-framework that persists data to a local datastore, the method comprising:
   receiving, by a synchronization framework executing on the computer, an indication from the local object-graph-and-persistence-framework that a locally-managed object has been retrieved from the local datastore and instantiated;
   determining whether said indication was instigated by a local user's activity or by a background synchronization process; and
   only when said indication is determined to have been instigated by said local user's activity, said synchronization framework:
      determining whether said locally-managed object has been recently synchronized with the remote database;
      when said locally-managed object has not been recently synchronized with the remote database, requesting a remote copy of said locally-managed object from the remote database; and
      providing said locally-managed object for use in connection with a local user-interface provided by the computer;
   wherein receiving said indication comprises receiving an 'awakeFromFetch' message from the local object-graph-and-persistence-framework.

2. The method of claim 1, further comprising:
   receiving said remote copy of said locally-managed object from the remote database; and
   notifying said local user-interface that said remote copy of said locally-managed object has been received when said remote copy of said locally-managed object differs from said locally-managed object.

3. The method of claim 2, further comprising persisting said remote copy of said locally-managed object to the local datastore when said remote copy of said locally-managed object differs from said locally-managed object.

4. The method of claim 2, further comprising marking said remote copy of said locally-managed object as having been synchronized at a current time.

5. The method of claim 1, wherein determining whether said indication was instigated by said local user's activity comprises determining whether said indication originated from a main application thread.

6. A computing apparatus comprising a processor and a memory having stored therein instructions that when executed by the processor, configure the apparatus to perform a method for synchronizing data between a remote database and a local object-graph-and-persistence-framework that persists data to a local datastore, the method comprising:
   receiving, by a synchronization framework executing on the computing apparatus, an indication from the local object-graph-and-persistence-framework that a locally-managed object has been retrieved from the local datastore and instantiated;
   determining whether said indication was instigated by a local user's activity or by a background synchronization process; and
   only when said indication is determined to have been instigated by said local user's activity, said synchronization framework:
      determining whether said locally-managed object has been recently synchronized with the remote database;
      when said locally-managed object has not been recently synchronized with the remote database, requesting a remote copy of said locally-managed object from the remote database; and
      providing said locally-managed object for use in connection with a local user-interface provided by the computing apparatus;
   wherein receiving said indication comprises receiving an 'awakeFromFetch' message from the local object-graph-and-persistence-framework.

7. The apparatus of claim 6, the method further comprising:
   receiving said remote copy of said locally-managed object from the remote database; and
   notifying said local user-interface that said remote copy of said locally-managed object has been received when said remote copy of said locally-managed object differs from said locally-managed object.

8. The apparatus of claim 7, the method further comprising persisting said remote copy of said locally-managed object to the local datastore when said remote copy of said locally-managed object differs from said locally-managed object.

9. The apparatus of claim 7, the method further comprising marking said remote copy of said locally-managed object as having been synchronized at a current time.

10. A non-transient computer-readable storage medium having stored therein instructions that when executed by a processor, configure the processor to perform a method for synchronizing data between a remote database and a local object-graph-and-persistence-framework that persists data to a local datastore, the method comprising:
- receiving, by a synchronization framework executing on the processor, an indication from the local object-graph-and-persistence-framework that a locally-managed object has been retrieved from the local datastore and instantiated;
- determining whether said indication was instigated by a local user's activity or by a background synchronization process; and
- only when said indication is determined to have been instigated by said local user's activity, said synchronization framework:
  - determining whether said locally-managed object has been recently synchronized with the remote database;
  - when said locally-managed object has not been recently synchronized with the remote database, requesting a remote copy of said locally-managed object from the remote database; and
  - providing said locally-managed object for use in connection with a local user-interface provided by the processor;
- wherein receiving said indication comprises receiving an 'awakeFromFetch' message from the local object-graph-and-persistence-framework.

11. The storage medium of claim 10, the method further comprising:
- receiving said remote copy of said locally-managed object from the remote database; and
- notifying said local user-interface that said remote copy of said locally-managed object has been received when said remote copy of said locally-managed object differs from said locally-managed object.

12. The storage medium of claim 11, the method further comprising persisting said remote copy of said locally-managed object to the local datastore when said remote copy of said locally-managed object differs from said locally-managed object.

13. The storage medium of claim 11, the method further comprising marking said remote copy of said locally-managed object as having been synchronized at a current time.

14. A computer-implemented method for synchronizing data between a remote database and a local object-graph-and-persistence-framework that persists data to a local datastore, the method comprising:
- receiving, by a synchronization framework executing on the computer, an indication from the local object-graph-and-persistence-framework to validate an instantiated locally-managed object prior to persisting said instantiated locally-managed object to the local datastore;
- allowing the local object-graph-and-persistence-framework to persist said instantiated locally-managed object in the local datastore;
- determining whether said indication was instigated by a local user's activity or by a background synchronization process; and
- only when said indication is determined to have been instigated by said local user's activity, providing said instantiated locally-managed object to be persisted in the remote database;
- wherein receiving said indication comprises receiving from the local object-graph-and-persistence-framework a message selected from a group consisting of 'validateForDelete', 'validateForInsert', and 'validateForUpdate'.

15. The method of claim 14, wherein determining whether said indication was instigated by said local user's activity comprises determining whether said indication originated from a main application thread.

16. A computing apparatus comprising a processor and a memory having stored therein instructions that when executed by the processor, configure the apparatus to perform a method for synchronizing data between a remote database and a local object-graph-and-persistence-framework that persists data to a local datastore, the method comprising:
- receiving, by a synchronization framework executing on the computing apparatus, an indication from the local object-graph-and-persistence-framework to validate an instantiated locally-managed object prior to persisting said instantiated locally-managed object to the local datastore;
- allowing the local object-graph-and-persistence-framework to persist said instantiated locally-managed object in the local datastore;
- determining whether said indication was instigated by a local user's activity or by a background synchronization process; and
- only when said indication is determined to have been instigated by said local user's activity, providing said instantiated locally-managed object to be persisted in the remote database;
- wherein receiving said indication comprises receiving from the local object-graph-and-persistence-framework a message selected from a group consisting of 'validateForDelete', 'validateForInsert', and 'validateForUpdate'.

17. The apparatus of claim 16, wherein determining whether said indication was instigated by said local user's activity comprises determining whether said indication originated from a main application thread.

18. A non-transient computer-readable storage medium having stored therein instructions that when executed by a processor, configure the processor to perform a method for synchronizing data between a remote database and a local object-graph-and-persistence-framework that persists data to a local datastore, the method comprising:
- receiving, by a synchronization framework executing on the processor, an indication from the local object-graph-and-persistence-framework to validate an instantiated locally-managed object prior to persisting said instantiated locally-managed object to the local datastore;
- allowing the local object-graph-and-persistence-framework to persist said instantiated locally-managed object in the local datastore;
- determining whether said indication was instigated by a local user's activity or by a background synchronization process; and
- only when said indication is determined to have been instigated by said local user's activity, providing said instantiated locally-managed object to be persisted in the remote database;
- wherein receiving said indication comprises receiving from the local object-graph-and-persistence-framework a message selected from a group consisting of 'validateForDelete', 'validateForInsert', and 'validateForUpdate'.

19. The storage medium of claim 18, wherein determining whether said indication was instigated by said local user's activity comprises determining whether said indication originated from a main application thread.

* * * * *